(12) United States Patent
Berenguer et al.

(10) Patent No.: US 7,542,053 B2
(45) Date of Patent: Jun. 2, 2009

(54) METHODS AND APPARATUS FOR RE-SCALING IMAGE BY VARIABLE RE-SCALING FACTOR

(75) Inventors: Inaki Berenguer, Alicante (ES); Raju Hormis, New York, NY (US); Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 11/093,674

(22) Filed: Mar. 30, 2005

(65) Prior Publication Data

US 2006/0227152 A1   Oct. 12, 2006

(51) Int. Cl.
*G09G 5/00* (2006.01)
*G06K 9/32* (2006.01)
*H04N 9/74* (2006.01)

(52) U.S. Cl. ............... 345/660; 382/298; 345/698; 348/581

(58) Field of Classification Search ........... 382/298; 345/698, 660–661; 348/581
See application file for complete search history.

(56) References Cited

U.S. PATENT DOCUMENTS

| | | | |
|---|---|---|---|
| 7,158,158 B1 * | 1/2007 | Fleming et al. | 345/698 |
| 7,239,671 B2 * | 7/2007 | Wood et al. | 375/296 |
| 2004/0145501 A1 * | 7/2004 | Hung | 341/61 |
| 2005/0134731 A1 * | 6/2005 | Lee et al. | 348/458 |
| 2005/0196072 A1 * | 9/2005 | Zhong | 382/298 |
| 2006/0039514 A1 * | 2/2006 | Radakovic | 375/355 |

* cited by examiner

*Primary Examiner*—Jin-Cheng Wang
(74) *Attorney, Agent, or Firm*—Buckley, Maschoff & Talwalkar LLC

(57) ABSTRACT

A method includes receiving a sequence of samples that represents a row of pixels in an image. The method further includes selecting a re-scaling factor for at least a portion of the row of pixels. The method further includes selecting a filter from a bank of low pass filters based on the selected re-scaling factor, and low-pass filtering the sequence of samples with the selected filter. The method further includes up-sampling the low-pass-filtered sequence of samples by a factor M with a polyphase filter bank having a windowed sinc(t) characteristic to the up-sampled sequence of samples, and down-sampling the polyphase-filtered sequence of samples.

12 Claims, 18 Drawing Sheets

| | | | | | |
|---|---|---|---|---|---|
| $h_0[n]$ | h[0] | h[64] | h[128] | ... | h[640] |
| $h_1[n]$ | h[1] | | | | |
| $h_2[n]$ | h[2] | | | | |
| | h[3] | | | | |
| | ⋮ | | | | |
| $h_{63}[n]$ | h[63] | | | | h[703] |

METHODS AND APPARATUS FOR RE-SCALING IMAGE BY VARIABLE RE-SCALING FACTOR

BACKGROUND

It is a desirable feature of video signal processing integrated circuits (ICs) to have the capability of re-scaling (re-sizing) an input video image such that the output video signal has different dimensions (measured in pixels) from the input video signal. Video image resizing may be useful for applications such as conversion between standard definition and high definition formats, aspect ratio correction, picture-in-picture displays, chroma interpolation, or conversion between so-called "letter-box" and full-screen formats. The latter application may call for anamorphic re-scaling, in which the resizing factor may vary from one picture dimension to the other and/or from one region of the image plane to another.

BRIEF DESCRIPTION OF THE DRAWINGS

FIG. 4 schematically illustrates a table that may be used to implement a polyphase filter bank having the characteristic shown in FIG. 3.

DETAILED DESCRIPTION

Figure 1:
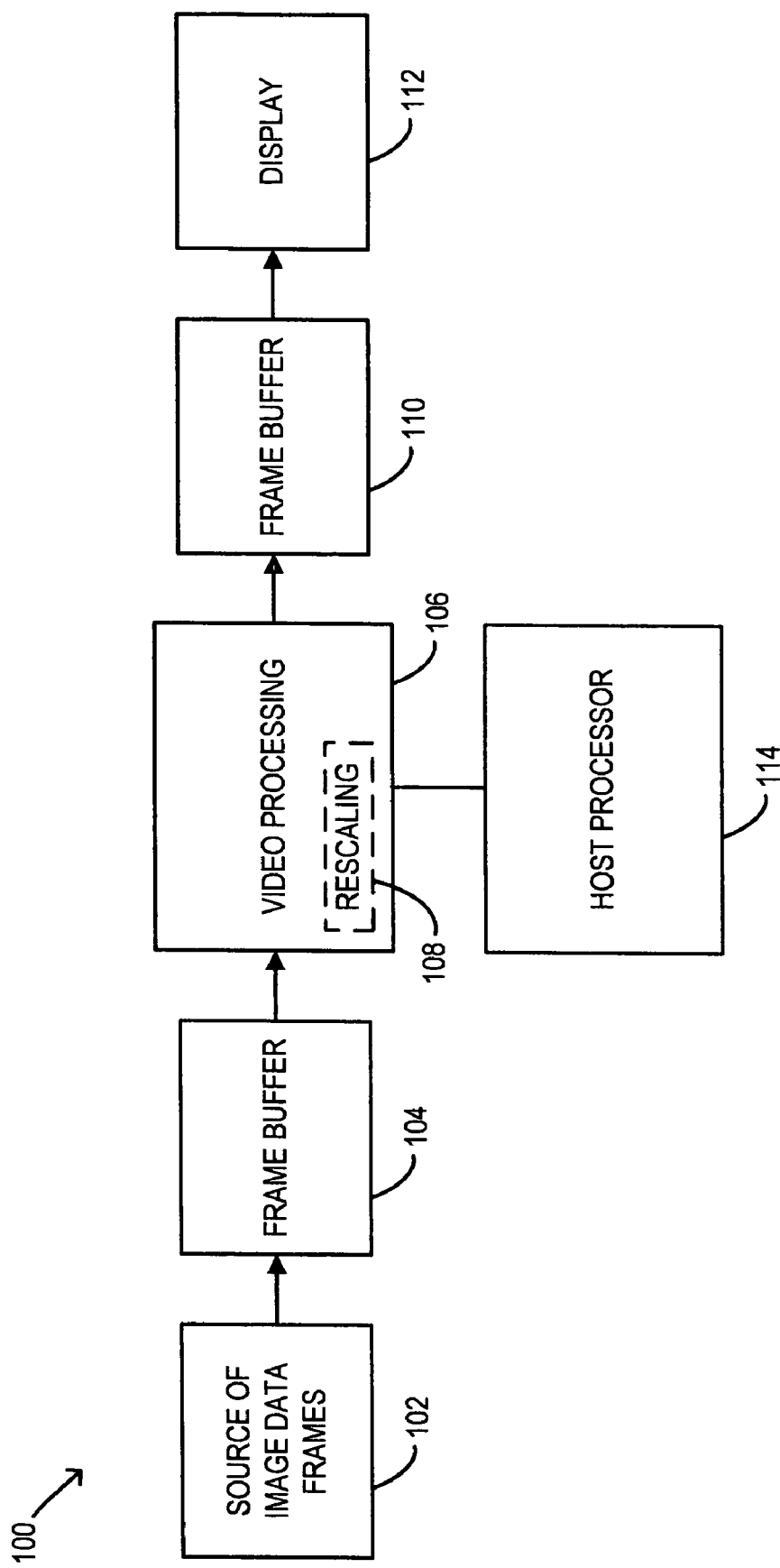
FIG. 1 is a block diagram of a system provided according to some embodiments.

FIG. 1 is a block diagram of a system 100 for displaying video signals. The system 100 may include a source 102 of image data frames. The image data source 102 may, for example, include one or more of a television tuner, a DVD drive, a computer hard drive, a network interface, a cable television set-top box, a digital video tape recorder, a personal video recorder, etc. The system 100 may also include an input frame buffer 104 coupled to the image data source 102 to store one or more image data frames provided by the image data source 102.

The system 100 may further include a video processing device 106 (e.g., an IC) that is coupled to the input frame buffer. The video processing device 106 may perform various types of processes with respect to the input image signal, such as re-scaling by a re-scaling circuit indicated at 108.

In addition, the system 100 may include an output frame buffer 110 coupled to the video processing device 106 to store processed (e.g., re-sized) image data frames output from the video processing device 106. Still further the system 100 may include a display device 112 (CRT, flat panel display, liquid crystal display, etc.) coupled to the output frame buffer 110 to display image signals provided from the output frame buffer 110.

The system 100 may also include a host processor 114 coupled to the video processing device 106. The host processor 114 may be a general purpose microprocessor, microcontroller or the like, and may control the video processing device 106 and/or other aspects of the system 100.

Figure 2:
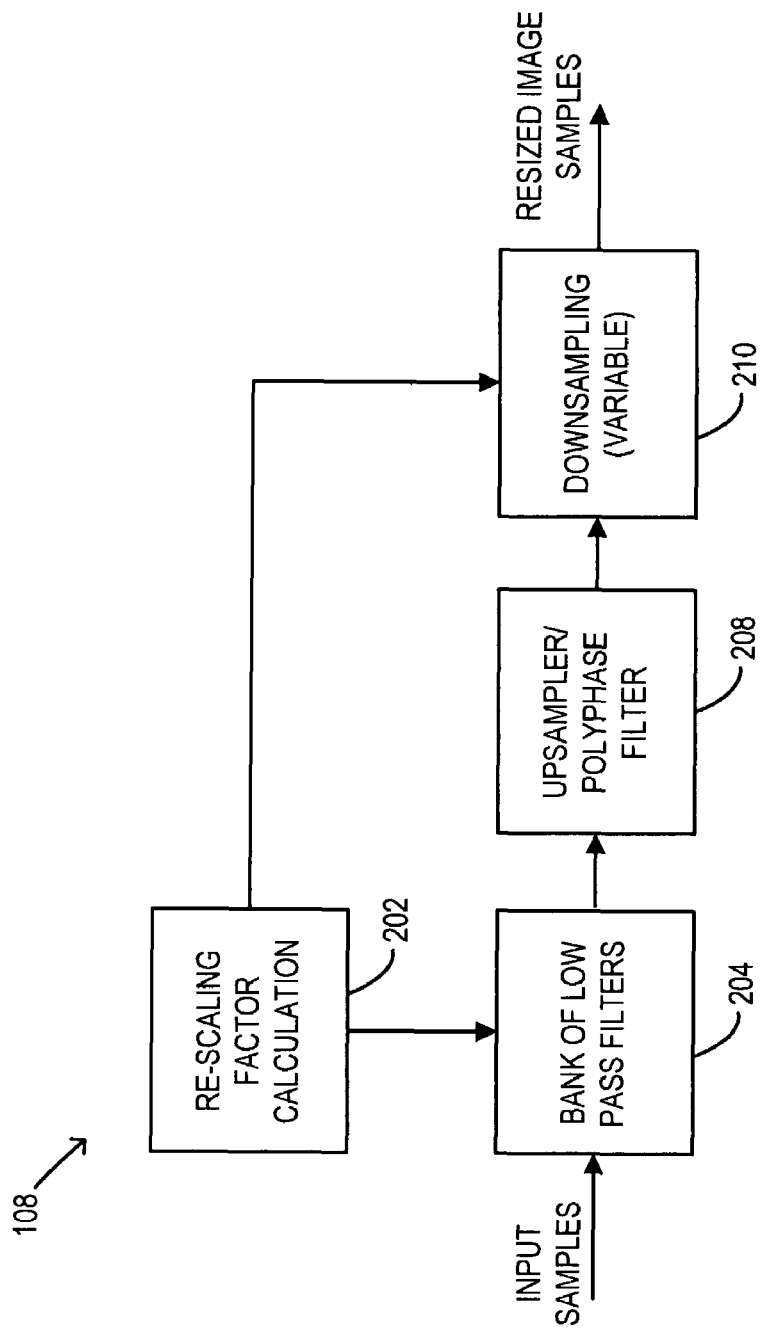
FIG. 2 illustrates in block diagram form an image re-scaling circuit that is part of a video processing IC included in the system of FIG. 1.

FIG. 2 is a block diagram which shows aspects of the image re-scaling circuit 108 of the video processing device. The image re-scaling circuit 108, and other embodiments of the image re-scaling circuit described hereinafter, may be operable to re-scale images in accordance with a wide range of re-scaling factors, both greater than one (for upscaling) and less than one (for downscaling). In some embodiments, the re-scaling factor to be used may be arbitrarily selected according to the needs of the image re-sizing application to be performed by the image re-scaling circuit. Moreover, image re-scaling circuits described hereinafter may be operable to perform anamorphic re-scaling, including re-scaling that changes along a horizontal line (row) and/or along a vertical column of pixels.

The re-scaling circuitry illustrated in FIG. 2 may operate as a one-dimensional re-scaler, which first may be applied to rows of image pixels and thereafter to columns of the horizontally re-sized image to produce an image that has been re-sized in both dimensions. (Alternatively, the one-dimensional re-scaler may first be applied vertically and thereafter horizontally.)

One approach to one-dimensional resizing may involve obtaining a continuous function that is represented by a sequence of pixel values and then re-sampling the continuous function (or an approximation thereof) to increase or decrease the number of samples per fixed time interval. Such an approach is approximated by the re-scaling circuitry of FIG. 2.

The image re-scaling circuit 108 shown in FIG. 2 includes a re-scaling factor calculating block 202. The re-scaling factor calculating block 202 may calculate a re-scaling factor that varies depending on the current position along a row or column of pixels that is being processed by the circuit 108. In this way anamorphic re-scaling may be supported, with the re-scaling factor being selected by the block 202 as required. In other embodiments and/or for other applications, the block 202 may select a re-scaling factor that is constant along a row or column of pixels.

The image re-scaling circuit 108 further includes a bank 204 of low pass filters, one of which is selected by the block 202 to receive the sequence of input image data samples (input pixel values). The particular low-pass filter to be selected from the filter bank 204 may be selected on the basis of the currently selected re-scaling factor. In some embodiments, the filter bank 204 may be constituted by ten low pass filters respectively having cut-off frequencies of $0.9*\pi$, $(0.9)^2*\pi$, $(0.9)^3*\pi$, ..., $(0.9)^{10}*\pi$.

The image re-scaling circuit 108 also includes a polyphase filter bank 208 coupled downstream from the filter bank 204 to filter the low-pass filtered sample sequence output from the filter bank 204. Properties of the polyphase filter bank 208 will be described below. In addition to filtering its input sample sequence, the polyphase filter bank 208 operates to upsample its input sample sequence by a factor M. Further, the image re-scaling circuit 108 includes a down-sampling block 210 that is coupled downstream from the polyphase filter bank 208 to down-sample (decimate) the filtered sample stream output by the polyphase filter bank 208. The down-sampling block 210 may down-sample the sample stream by a factor of N (N being an integer) by selecting and outputting only every Nth sample from the sample sequence output by the polyphase filter bank 208. N may be selected by the re-scaling factor calculating block 202 such that M/N is substantially equal to the re-scaling factor currently selected by the block 202. The down-sampling factor N may be variable along a row and or column of pixels to implement anamorphic re-scaling. Where the currently selected re-scaling factor is greater than one (for upscaling the input image), it will be understood that N is an appropriate value that is less than M. Where the currently selected re-scaling factor is less than one (for downscaling the input image), N is selected to be an appropriate value that is greater than M.

Where N is greater than M (for downscaling), the re-scaling factor calculating block 202 selects from the filter bank 204 a low pass filter having the widest passband that is sufficiently narrow to substantially prevent aliasing from arising from the down-sampling performed at block 210. Thus the filter bank 204 effectively functions as a variable anti-aliasing filter. Where N is less than M (for upscaling), the filter bank 204 may be by-passed by the input image sample stream.

Figure 3:
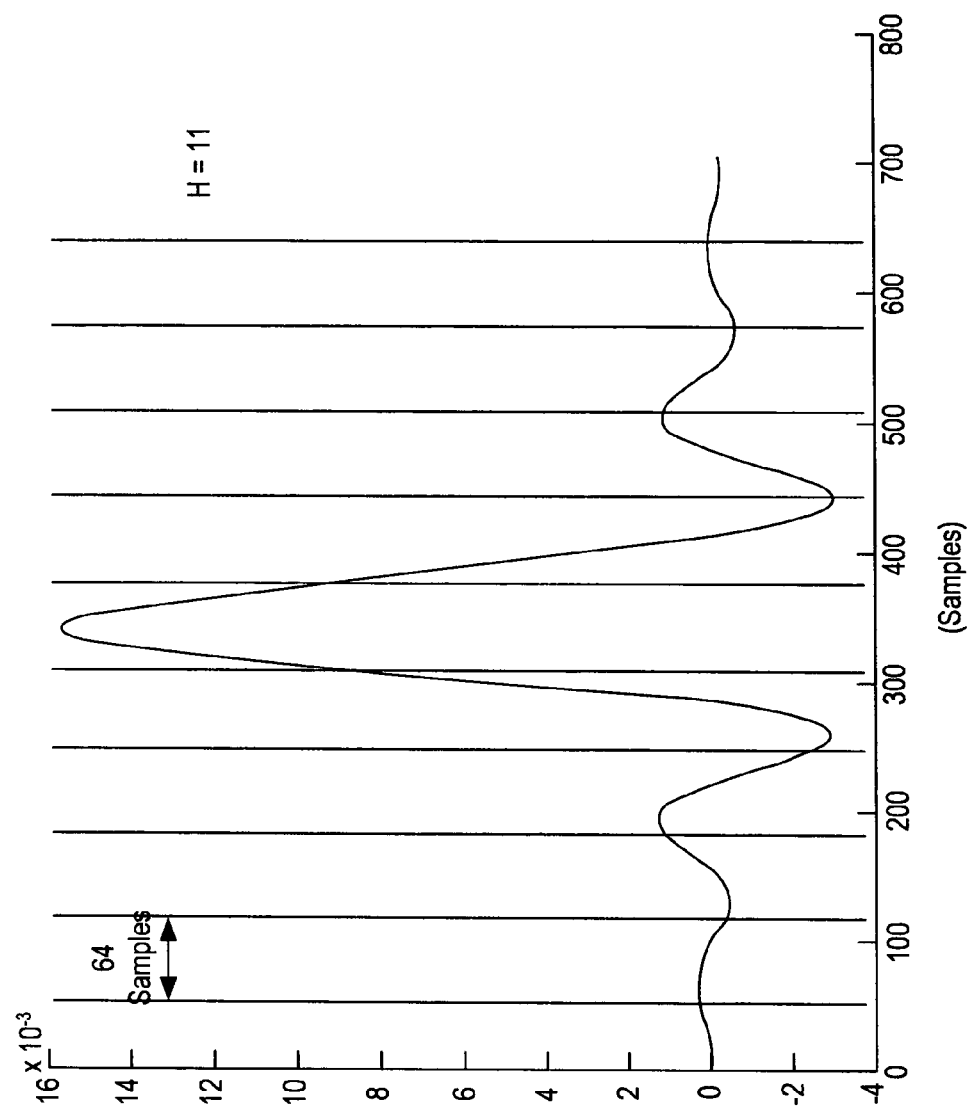
FIG. 3 graphically illustrates a filter characteristic for a filter included in the re-scaling circuit of FIG. 2.

FIG. 3 graphically illustrates a filter characteristic of prototype filter for the polyphase filter bank 208. The curve shown in FIG. 3 represents a sinc(t) functions truncated (windowed) by being multiplied by a window function w(t). In some embodiments, w(t) may be a Kaiser window with a parameter β selected to be 0.6. Other values of β may be employed in other embodiments. In other embodiments another window function such as a Hamming window or a Hanning window may be employed instead of a Kaiser window.

The polyphase filter bank 208 may, in some embodiments, be a set of 11-tap filters, with the main tap coinciding in position with the peak of the curve shown in FIG. 3. The taps may be spaced apart from each other by 64 samples so that the polyphase filter bank 208 has 64 phases. Alternatively the filters of the polyphase filter bank may each have nine taps or another number of taps. In addition or alternatively, the number of phases may be 128 or another number different from 64.

FIG. 4 schematically illustrates a table 402 that may be used to implement the polyphase filter bank 208. Each cell of the table 402 holds a respective filter coefficient value. It is assumed for the purposes of the table 402 that the polyphase filter bank 208 has 11 taps and 64 phases. The coefficients are valued such that reading the coefficients down the columns in sequence, proceeding from the left-most to the right-most column, substantially approximates the filter characteristic illustrated in FIG. 3. Each row of table 402 represents an 11 tap filter which is a respective phase of the polyphase filter bank 208. The table may be stored in a suitable manner in the re-scaling circuit 108 (e.g., by a table memory which is not separately shown). In some embodiments, only half the coefficients illustrated in FIG. 4 need to be stored, since the filter characteristic is symmetric.

Figure 5:
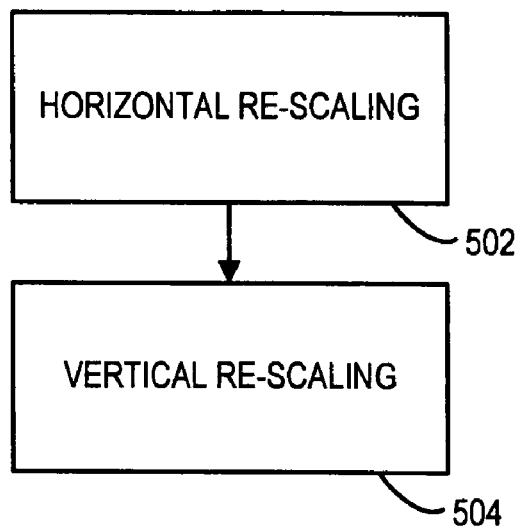
FIG. 5 is a high level flow chart that illustrates a process performed in the re-scaling circuit of FIG. 2.

FIG. 5 is a high level flow chart that illustrates a process performed in the re-scaling circuit 108. At 502 in FIG. 5, the horizontal rows of pixels are re-scaled one after the other by the re-scaling circuit 108. Thereafter, at 504, the columns of pixels of the horizontally re-scaled image are re-scaled.

Figure 6:
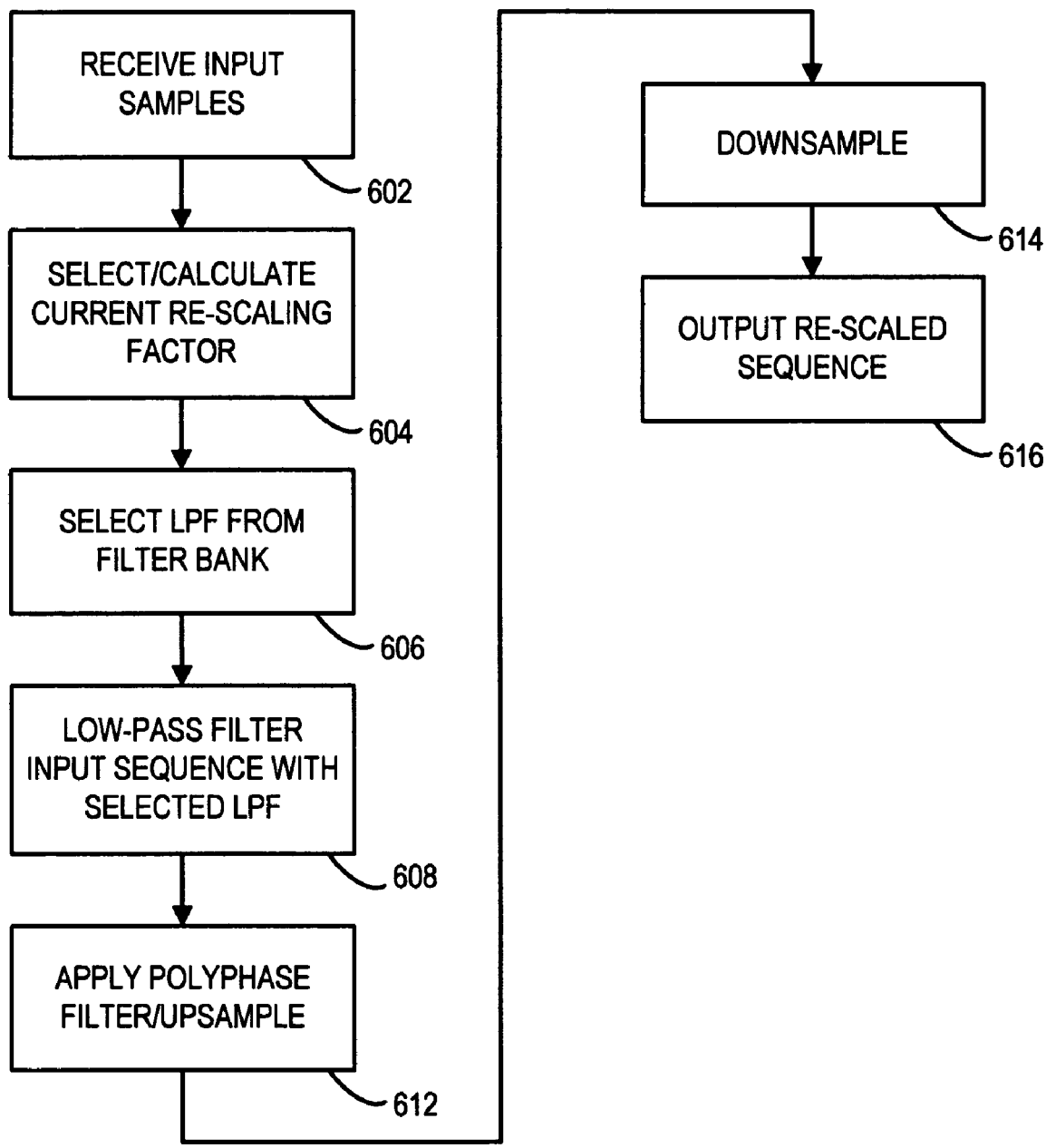
FIG. 6 is a flow chart that illustrates a one-dimensional re-scaling process performed as part of the process of FIG. 5.

FIG. 6 is a flow chart that illustrates a one-dimensional re-scaling process performed by the re-scaling circuit 108 as part of the process of FIG. 5. For example, the process of FIG. 6 may be applied to re-scale a row or column of pixels.

At 602 in FIG. 6, a sequence of input samples (e.g., representing a row of pixels in the image to be re-scaled) is received by the re-scaling circuit 108. At 604, the re-scaling factor calculating block 202 calculates or selects the current re-scaling factor to be applied in view of the current location along the row of pixels. (It should be understood that calculating a re-scaling factor is one way of selecting the re-scaling factor.) The selected re-scaling factor is applicable to at least a portion of the row of pixels (i.e., to at least one pixel). Alternatively the selected re-scaling factor is applicable to at least a portion of a current column of pixels, assuming that vertical rather than horizontal re-scaling is currently being performed.

At 606 the re-scaling factor calculating block 202 selects one of the low pass filters from the filter bank 204, based on the currently selected re-scaling factor. As noted above, the low pass filter is selected which has the widest passband that is sufficiently narrow to substantially prevent aliasing that might otherwise result from the down-sampling to occur downstream. Alternatively, if the selected re-scaling factor is greater than one (i.e., upscaling is being performed) the filter bank 204 may be by-passed by the input sample sequence. At 608, if the filter bank 204 is not by-passed, the input sample sequence is low-pass filtered by the selected filter from the filter bank 204.

Figure 7:
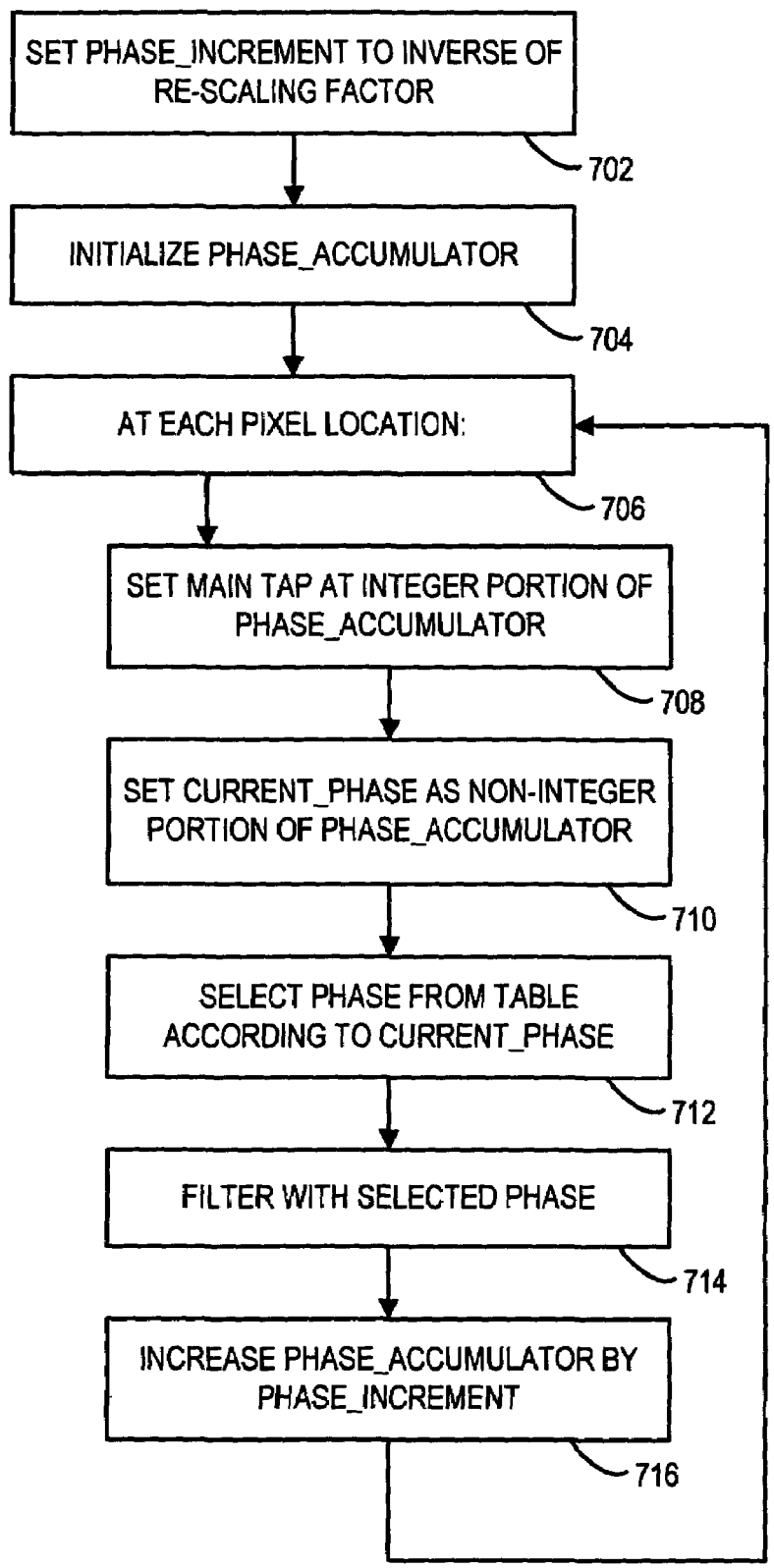
FIG. 7 is a flow chart that illustrates some details of the process of FIG. 6.

At 612, the polyphase filter bank 208 is applied to the low-pass filtered sequence of samples provided by the up-sampling block 206. FIG. 7 is a flow chart that illustrates details of the operation of polyphase filter bank 208. At 702 in FIG. 7, a variable that may be referred to as "phase_increment" is set to the inverse of the currently selected re-scaling factor. At 704, a variable that may be referred to as "phase_accumulator" is initialized. In some embodiments the initial value of phase_accumulator may be set to 0.5. Then, as indicated at 706, a loop of functions is performed at each pixel location along the row (or column) of pixels. In the loop, as indicated at 708, the main tap of the polyphase filter bank is set at an index indicated by the integer portion of the phase_accumulator (i.e., "floor(phase_accumulator)"). At 710, the variable "current_phase" is set equal to the non-integer portion of phase_accumulator (i.e., current_phase=mod (phase_accumulator, 1)). At 712, a phase (a row) from the coefficient table 402 is selected in accordance with the value of current_phase. Then, at 714, the input stream for the polyphase filter bank (actually a portion of the input stream) is filtered by the selected phase. At 716, the value of phase_accumulator is increased by the value of phase_increment, and the pixel loop loops back to 706, 708, etc. to provide an output value for the next pixel.

It will be observed that this operation of the polyphase filter bank effectively upsamples its input sequence by a factor M (e.g., M=64 or 128) then decimates the filter output by a factor of N=(M divided by the re-scaling factor), thus accomplishing the down-sampling indicated at 614 in FIG. 6 and represented by block 210 in FIG. 2. The resulting output pixel values are the re-scaled sequence of samples indicated at 616 in FIG. 6. Also, effectively each input sample for the polyphase filter bank 208 is input for contribution to the filter output only once (i.e. only for one output pixel) so that the subsequence of input values subjected to the filter calculation slides by N samples along the input sequence for each pixel.

At the ends of each row or column, fill-in pixel values must be supplied for the filter operation. This may be done for example by zero-padding, replicating the first (or last) pixel value, or by mirroring the pixel values at the end or beginning of the row or column.

Although the setting of the phase_increment variable is illustrated at 702 in FIG. 7, implying a fixed re-scaling factor across the row or column, in some embodiments the value of the phase_increment variable may be set at the beginning of the pixel loop (i.e., before 708), so that the re-scaling factor can be changed at each pixel, allowing for anamorphic re-scaling. Similarly, the down-sampling factor N may be changed along the row or column.

Figure 8:
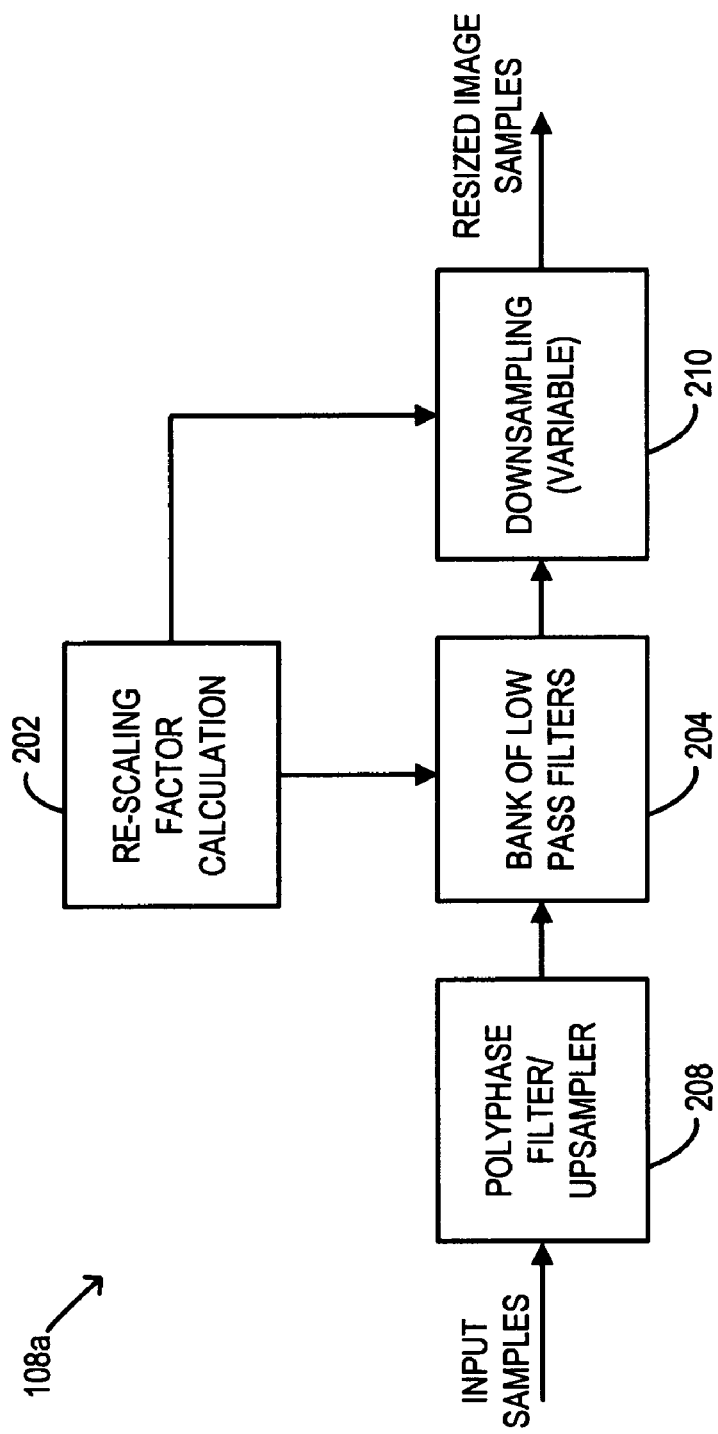
FIG. 8 is a block diagram of another embodiment of the image re-scaling circuit.

FIG. 8 is a block diagram that illustrates another embodiment of the re-scaling circuit. In the embodiment of FIG. 8, the variable low pass filter represented by the filter bank 204 is positioned between the polyphase filter bank 208 and the variable down-sampling block 210.

Figure 9:
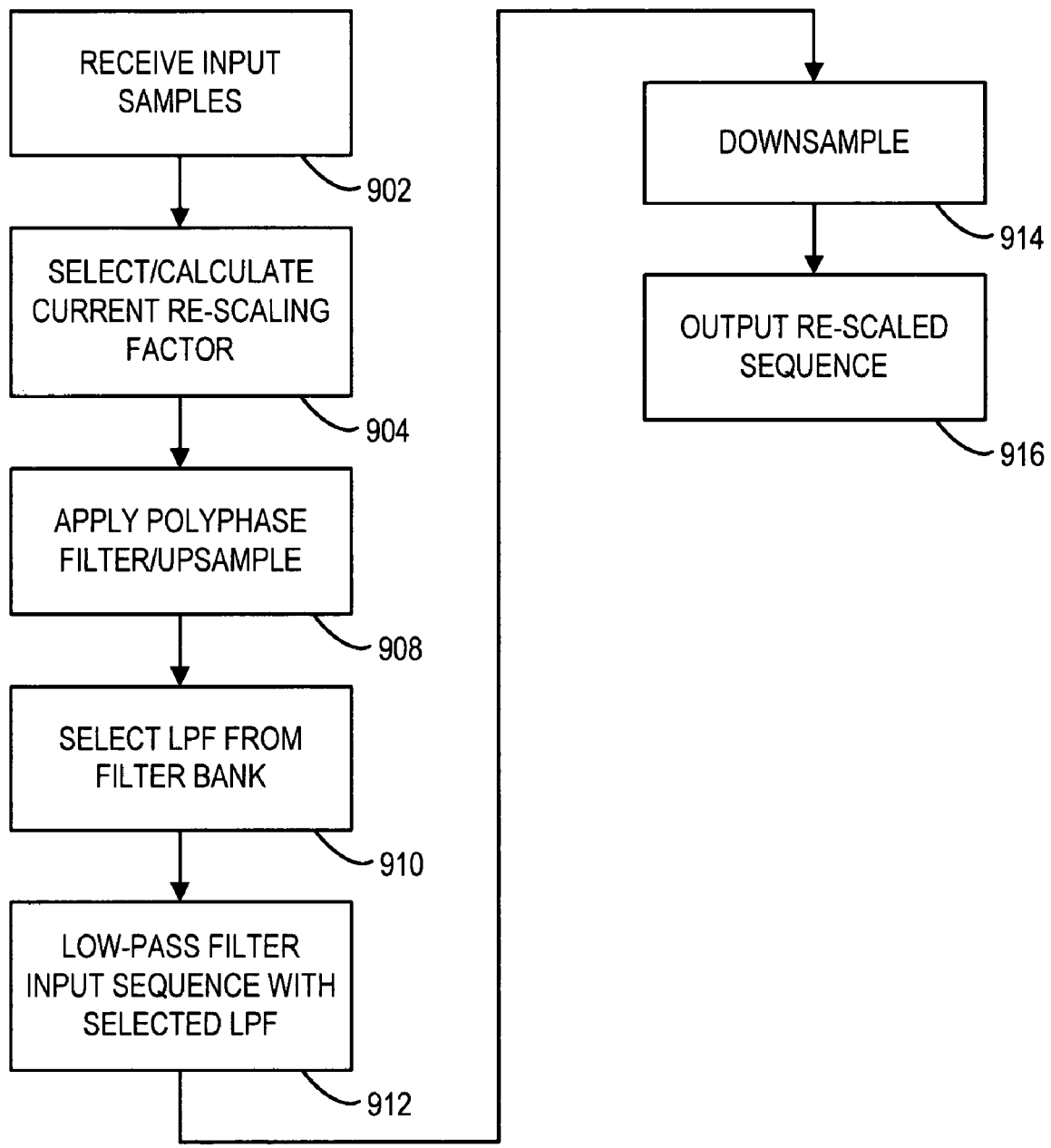
FIG. 9 is a flow chart that illustrates a one-dimensional re-scaling process performed in the image re-scaling circuit of FIG. 8.

FIG. 9 is a flow chart that illustrates a one-dimensional re-scaling process performed by the embodiment of the re-scaling circuit shown in FIG. 8.

At 902 in FIG. 9, a sequence of input samples (e.g., representing a row of pixels in the image to be re-scaled) is received by the re-scaling circuit. At 904, the re-scaling factor calculating block 202 calculates or selects the current re-scaling factor to be applied in view of the current location along the row of pixels (although the re-scaling factor need not be changed along the row of pixels). The selected re-scaling factor is applicable to at least a portion of the row of pixels (or to at least a portion of a column of pixels, as the case may be). At 908 the polyphase filter bank 208 is applied to the input sequence of samples and effectively upsamples the input sequence of samples by a factor M.

At 910, the re-scaling factor calculating block 202 selects one of the low pass filters from the filter bank 204, based on the currently selected re-scaling factor. The filter bank is selected which has the widest passband that is sufficiently narrow to substantially prevent aliasing that might otherwise result from the down-sampling which is to occur downstream. Or, as before, the filter bank 204 may be by-passed if the re-scaling factor is greater than one. At 912, if the filter bank 204 is not by-passed, the filtered sample sequence that is output from the polyphase filter bank 208 is low-pass filtered by the selected filter from the filter bank 204. Then, at down-sampling block 210, the low-pass-filtered sample sequence output from the filter bank 204 is down-sampled (914 in FIG. 9) by N, where N is selected by the block 202 such that M/N is substantially equal to the currently selected re-scaling factor. The resulting down-sampled sequence is output (as indicated at 916 in FIG. 9) as the re-scaled sequence to be produced by the re-scaling circuit.

Figure 10:
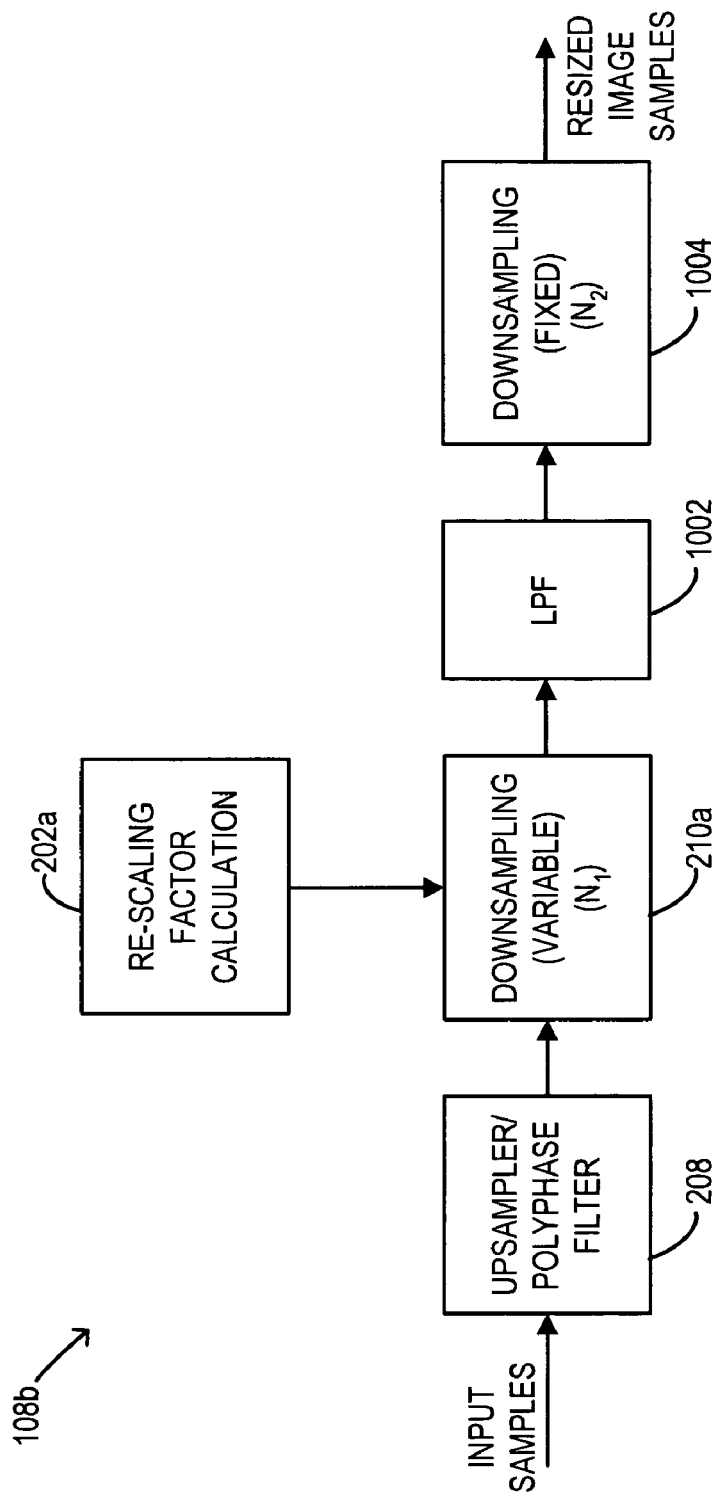
FIG. 10 is a block diagram of still another embodiment of the image re-scaling circuit.

FIG. 10 is a block diagram of another embodiment of the re-scaling circuit. The re-scaling circuit shown in FIG. 10 may include a re-scaling calculation block 202a, which calculates or selects the re-scaling factor (and may support anamorphic re-scaling), but which only controls a variable down-sampling block 210a, and not a variable low pass filter, which is not included in the embodiment of FIG. 10.

The re-scaling circuit of FIG. 10 may include a polyphase filter bank 208 as in the embodiment of FIG. 8, to receive the input sample sequence and to filter and up-sample the input sequence by a factor of M. The above-mentioned variable down-sampling block 210a is coupled downstream from the polyphase filter bank 208 to down-sample the sequence output from the polyphase filter bank 208 by a factor of $N_1$ that is selectable by the re-scaling factor calculation block 202a. A fixed low pass filter 1002 is coupled downstream from the variable down-sampling block 210a to low-pass filter the down-sampled sequence output from the block 210a. A fixed down-sampling block 1004 is coupled downstream from the low pass filter 1002 to down-sample the low-pass filtered sequence output from the low pass filter 1002 by a factor $N_2$.

The re-scaling factor calculating block 202a may select the variable down-sampling factor $N_1$ based on the currently selected re-scaling factor such that the expression $(M/(N_1*N_2))$ is substantially equal to the currently selected re-scaling factor. The fixed low pass filter 1002 may have a sufficiently narrow passband so as to perform effectively as an anti-aliasing filter for even the lowest possible down-scaling factor (corresponding to the maximum value of $N_1$) supported by the re-scaling circuit. The fixed down-sampling factor $N_2$ may be such that the ratio $M/N_2$ is at least as large as the maximum up-scaling factor to be supported by the re-scaling circuit. Anamorphic re-sampling may be supported so that the re-scaling factor and the variable down-sampling factor $N_1$ may be changed along the row and/or column of pixels.

Figure 11:
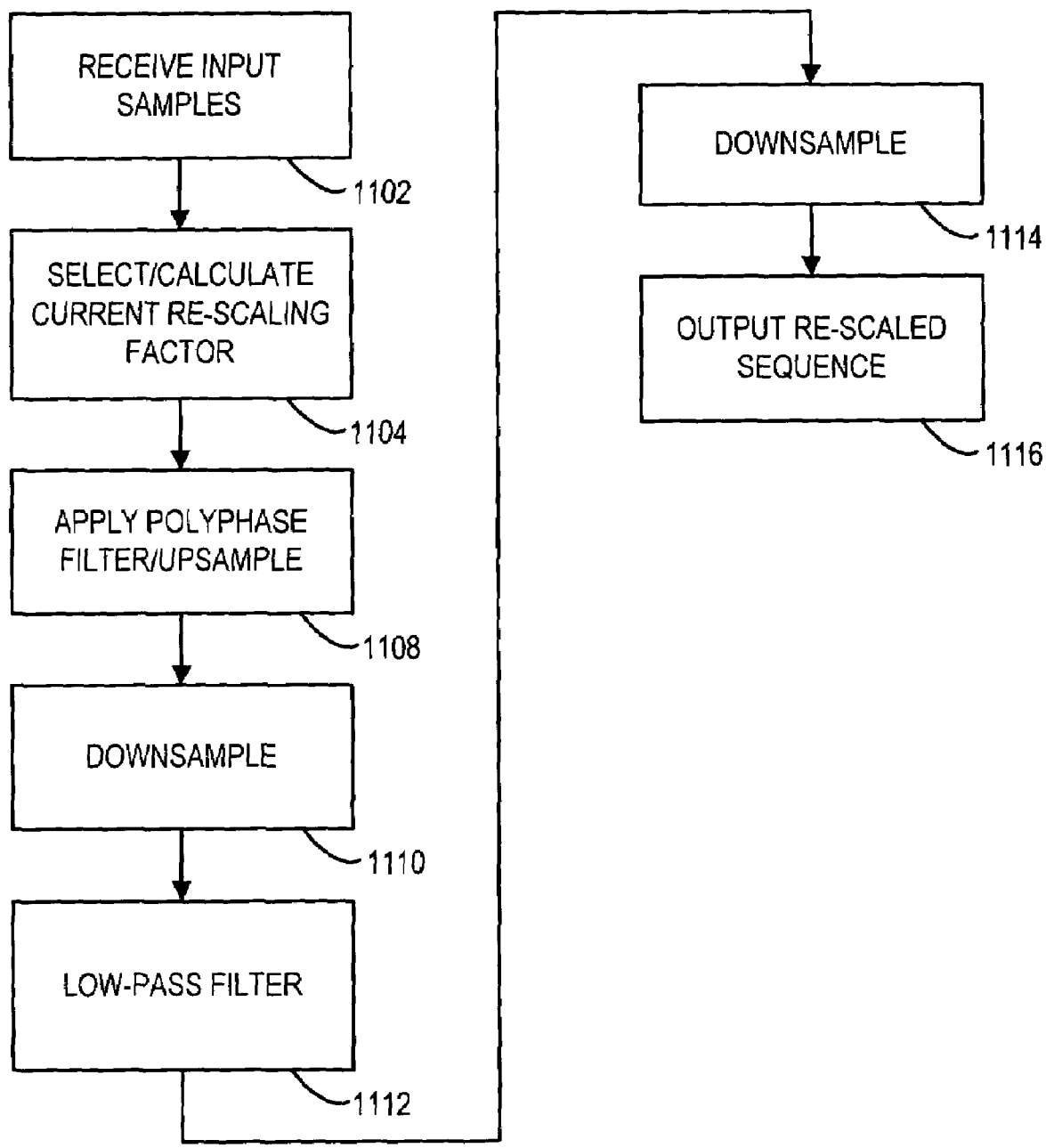
FIG. 11 is a flow chart that illustrates a one-dimensional re-scaling process performed in the image re-scaling circuit of FIG. 10.

FIG. 11 is a flow chart that illustrates a one-dimensional re-scaling process performed by the embodiment of the re-scaling circuit shown in FIG. 10.

At 1102 in FIG. 11, a sequence of input samples (e.g., representing a row of pixels in the image to be re-scaled) is received by the re-scaling circuit. At 1104, the re-scaling factor calculating block 202a calculates or selects the current re-scaling factor to be applied in view of the current location along the row of pixels. The selected re-scaling factor is applicable to at least a portion of the row of pixels (or to at least a portion of a column of pixels, as the case may be). At 1108 the polyphase filter bank 208 is applied to the input sequence of samples and effectively upsamples the input sequence of samples by a factor M. It may be advisable that $N_1$ be less than M to prevent aliasing.

Then, as indicated at 1110, at the variable down-sampling block 210a the filtered sample sequence output by the polyphase filter bank 208 is down-sampled at the variable down-sampling block 210a by the factor $N_1$ selected by the re-scaling factor calculating block 202a based on the currently selected re-scaling factor. Next, as indicated at 1112, the down-sampled sequence output from the block 210a is low-pass filtered by the LPF 1002. As indicated at 1114, at the fixed down-sampling block 1004, the low-pass-filtered sequence output from LPF 1002 is again down-sampled, this time by a fixed factor $N_2$, to output the desired re-scaled sample sequence, as indicated at 1116.

Figure 12:
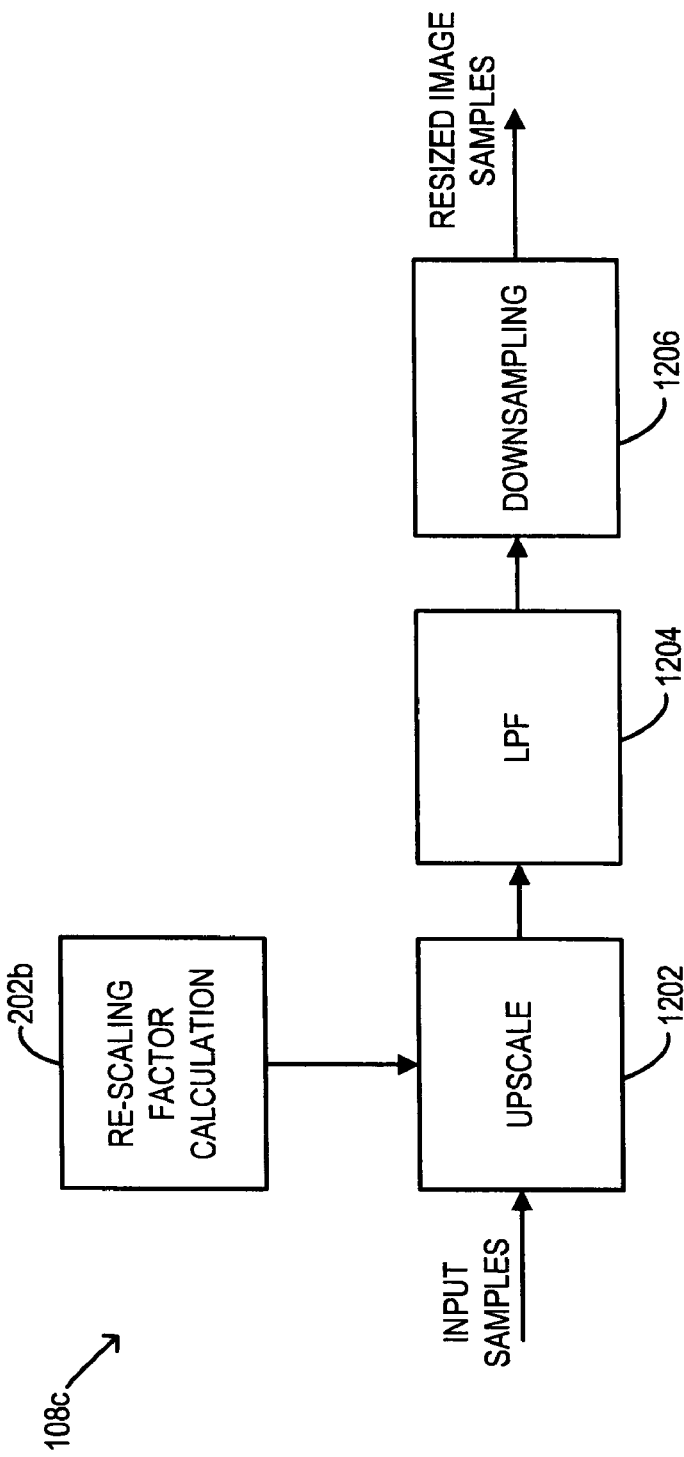
FIG. 12 is a block diagram of yet another embodiment of the image re-scaling circuit.

FIG. 12 is a block diagram that illustrates another embodiment of the re-scaling circuit. Once more, a one-dimensional re-scaler is shown, which may be applied first to horizontal line re-scaling and thereafter to vertical column re-scaling (or vice versa).

The re-scaling circuit 108c shown in FIG. 12 includes a re-scaling factor calculating block 202b to calculate or select a re-scaling factor to be applied by the re-scaling circuit. As before, the re-scaling factor calculating block 202b may support anamorphic re-scaling by changing (e.g., recalculating) the re-scaling factor along a row or column of pixels being processed by the re-scaling circuit.

The re-scaling circuit 108c further includes an up-scaling block 1202 which is coupled to receive the currently effective re-scaling factor from the re-scaling factor calculating circuit 202b. The up-scaling block 1202 performs an up-scaling operation, as described below, with respect to an input sequence of samples. The re-scaling circuit 108c also includes a low pass filter 1204 which is coupled downstream from the up-scaling block 1202 to low-pass filter the up-scaled sample sequence output from the up-scaling block 1202. Still further, the re-scaling circuit 108c includes a fixed down-sampling block 1206 which is coupled downstream from the LPF 1204 to down-sample the low-pass-filtered sample sequence output from the LPF 1204 by a factor of N. The LPF 1204 may have a cut-off frequency of $\pi/N$ to provide satisfactory anti-aliasing filtering.

Turning now to the up-scaling block 1202, the filtering performed therein may be substantially in accordance with the above-described windowed sinc(t) function, but the filter characteristic need not be stored in the form of a coefficient table such as that shown in FIG. 4. Rather, in some embodiments, to reduce memory requirements, intervals or segments of the filter characteristic may each be represented by a polynomial approximation of the segment (e.g., by a third order polynomial). For example, in the case of a 704 tap filter, segmented into 64 11 tap filters, the eleven curve segments defined by the vertical lines in FIG. 3 may each be represented by a respective third order polynomial approximation. To store each polynomial only four coefficients are needed, so that in this example, the entire filter characteristic can be stored with 44 coefficients, rather than the 704 coefficients needed if 64 phases were to be provided.

The one-dimensional re-scaling performed by the re-scaling circuit 108c entails the up-scaling block 1202 receiving a sequence of input samples (for a row or column of pixels). The up-scaling block 1202 also receives from the re-scaling factor calculating block 202b the currently applicable re-scaling factor selected by the re-scaling factor calculating block 202b. Some details of operation of the up-scaling block 1202 will now be described with reference to FIG. 13. At 1302 in FIG. 13, the phase_increment variable is set to equal the inverse of the quantity (N times the re-scaling factor). At 1304, the phase_accumulator variable is initialized. In some embodiments the initial value of phase_accumulator may be set to 0.5. Then, as indicated at 1306, a loop of functions is performed at each pixel location along the row (or column) of pixels. (As in other embodiments described, the setting of phase_increment indicated at 1302 may be incorporated in the pixel loop to allow for anamorphic re-scaling with a re-scaling factor that may vary from pixel to pixel.)

In the pixel loop, as indicated at 1308, the main tap of the filter is set at an index indicated by the integer portion of phase_accumulator. At 1310 the current_phase variable is set equal to the non-integer portion of phase_accumulator. At 1312, each of the polynomial approximations is evaluated at the point along the corresponding curve segment that corresponds to the value of current_phase. The resulting values represent an 11 (e.g.) tap filter at the needed phase of the filter represented by the polynomial approximations. Then, at 1314, the input sample sequence is filtered by the filter that results from the calculated values of the polynomials at the selected phase points of the curve segments. At 1316, the value of phase_accumulator is increased by the value of phase_increment, and the pixel loop loops back to handle the next pixel. The output from the up-scaler 1202 is a sequence that has been re-scaled by (N* the re-scaling factor) relative to the input sequence. The up-scaled sequence may then be low pass (anti-aliasing) filtered and decimated by a factor of N to produce a sequence that has been down-scaled by the re-scaling factor relative to the input sequence.

Where the re-scaling factor is greater than one, the low pass filtering and the down-sampling by N may be omitted, and the phase_increment may be set to the inverse of the re-scaling factor rather than the inverse of (N times the re-scaling factor), so that the up-scaler 1202 outputs a sequence that has been up-scaled by the re-scaling factor relative to the input sequence.

Where down-sampling is needed, it may be implemented as part of the filtering operation by advancing the main tap of the input data in increments of N samples.

Figure 13:
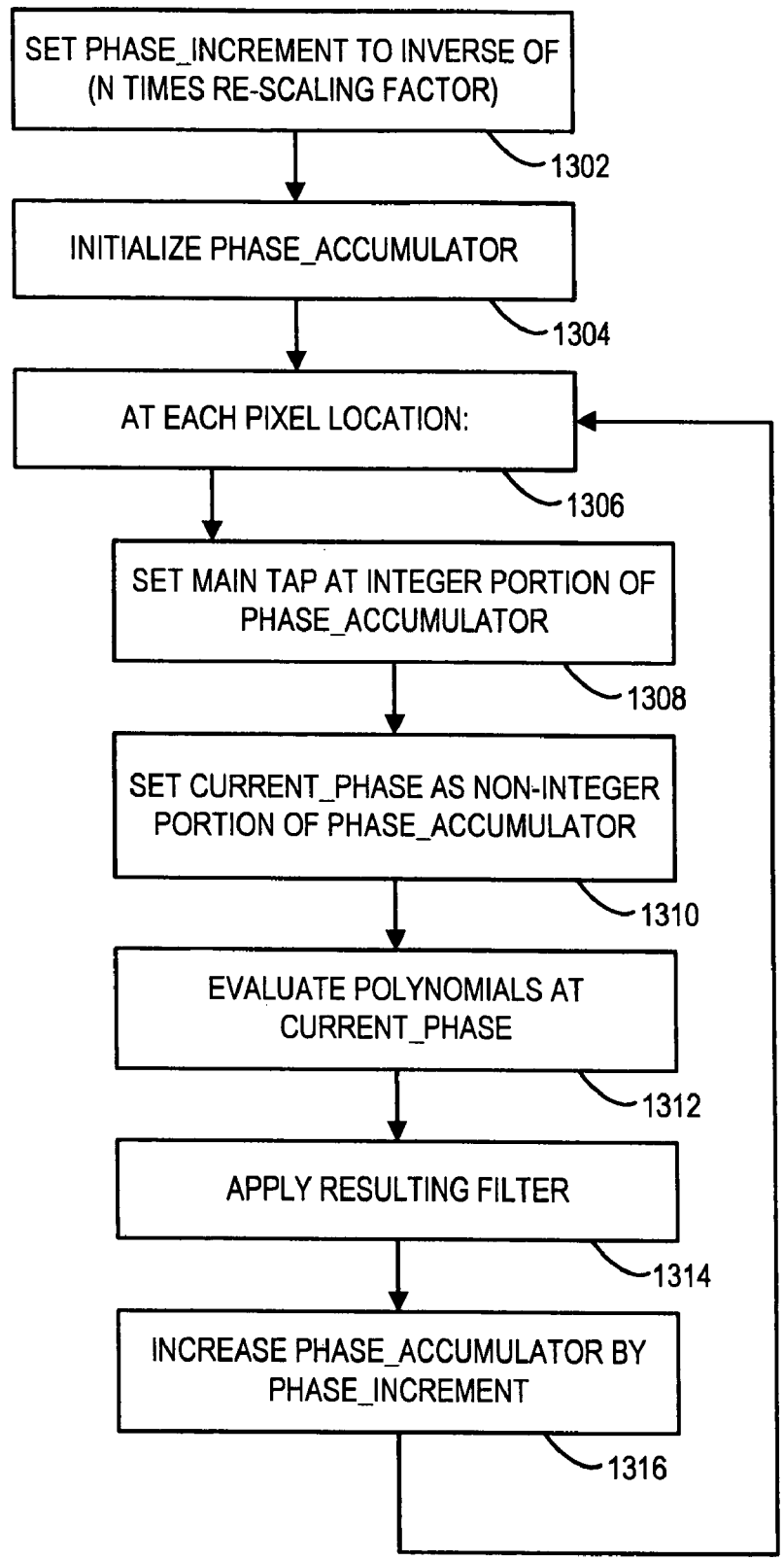
FIG. 13 is a flow chart that illustrates some details of another one-dimensional re-scaling process that may be performed in other embodiments of the image re-scaling circuit.

In other embodiments, the anti-aliasing filter 1204 and the down-sampling block 1206 may be omitted, in favor of an anti-aliasing filter (not shown) positioned upstream from the re-scaling algorithm of FIG. 13, provided that the algorithm is modified by having N=1 at 1302, so that the re-scaling algorithm either down-scales or up-scales depending on whether the re-scaling factor is less than or greater than one.

Figure 14:
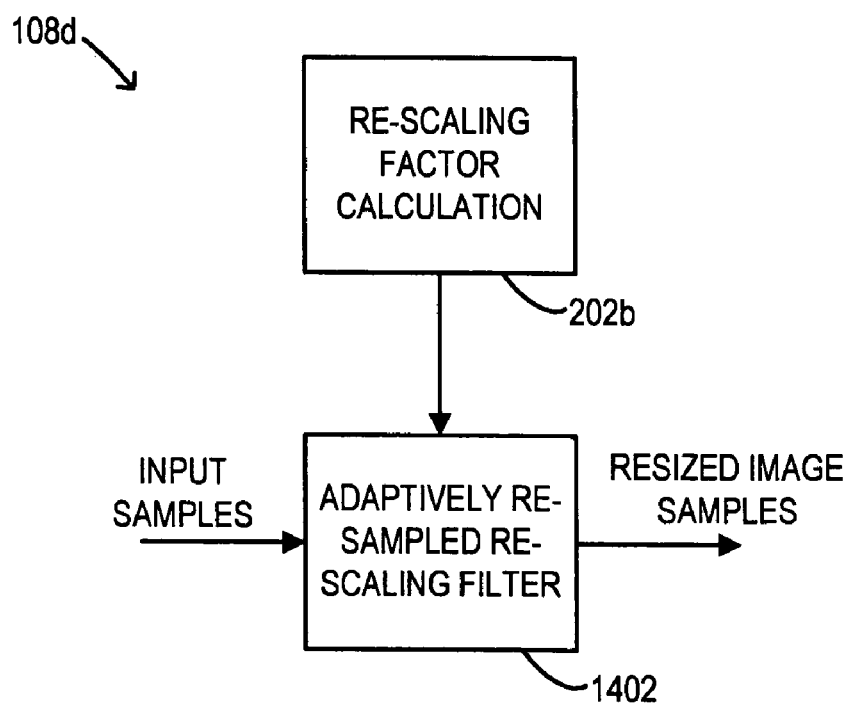
FIG. 14 is a block diagram of still another embodiment of the image re-scaling circuit.

FIG. 14 is a block diagram that shows still another embodiment of the re-scaling circuit. In the embodiment of FIG. 14, the anti-aliasing filter is integrated in a filter 1402 which performs the re-scaling. As before, the re-scaling performed by the filter 1402 may be in accordance with an arbitrary re-scaling factor calculated/selected by the re-scaling factor calculating block 202b, and may be anamorphic re-scaling in at least some cases. Also as before, the re-scaling by the filter 1402 is one-dimensional re-scaling that may be applied first to the horizontal lines of the image then to the vertical columns (or vice versa). The filter characteristic may be represented interval-wise by polynomial approximations (e.g., third order), which are in turn represented by polynomial coefficients, as in the embodiment of FIGS. 12-13.

Figure 15:
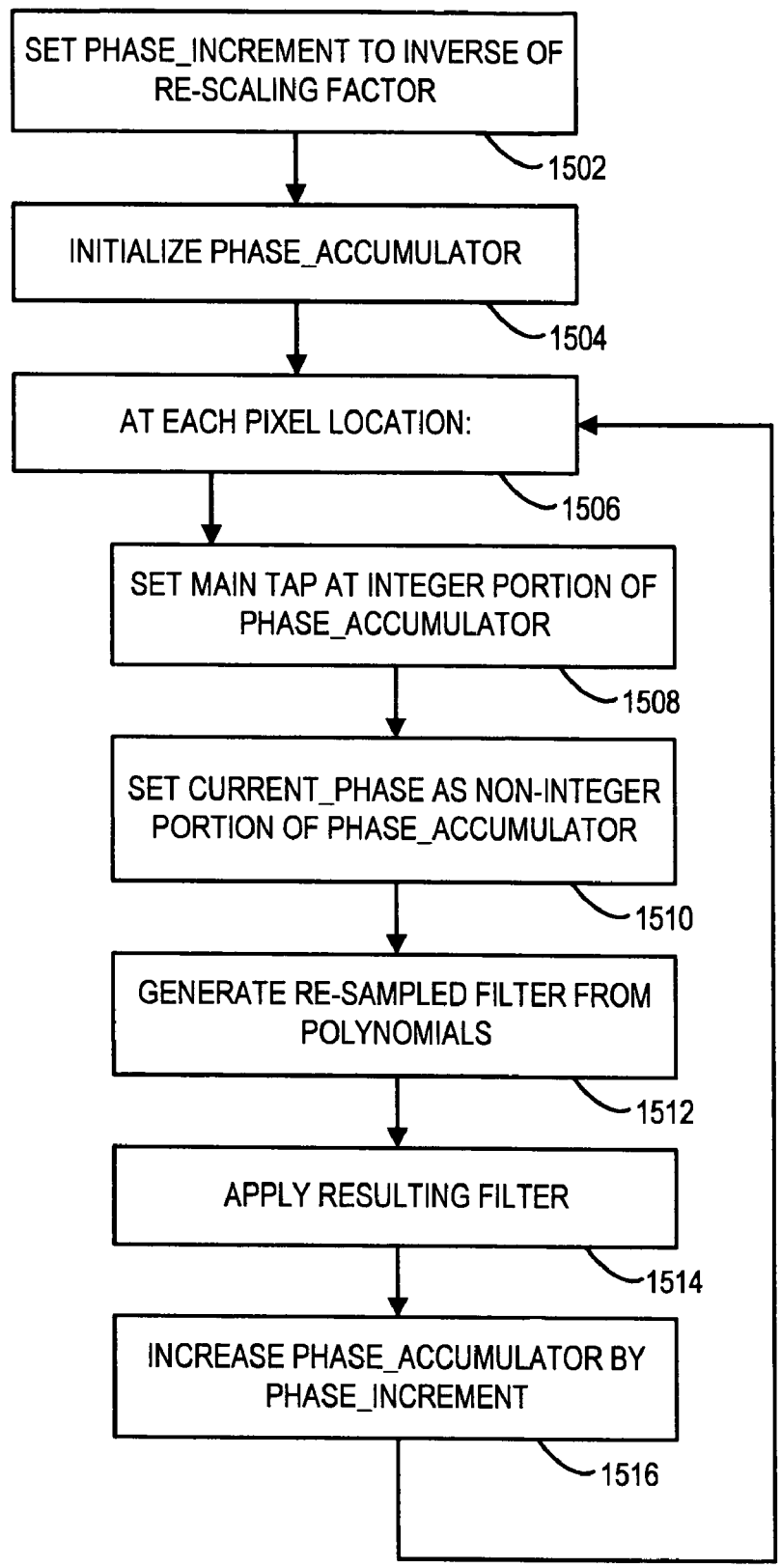
FIG. 15 is a flow chart that illustrates some details of a one-dimensional re-scaling process that may be performed in the image re-scaling circuit of FIG. 14.

Some details of operation of the re-scaling filter 1402 will now be described with reference to FIG. 15. At 1502 in FIG. 15, the phase_increment variable is set to equal the inverse of the re-scaling factor currently selected by the re-scaling factor calculating block. At 1504, the phase_accumulator variable is initialized. In some embodiments the initial value of phase_accumulator may be set to 0.5. Then, as indicated at 1506, a loop of functions is performed at each pixel location along the row (or column) of pixels. (As in other embodiments described herein, the setting of phase_increment indicated at 1502 may be incorporated in the pixel loop to allow for anamorphic re-scaling with a re-scaling factor that may vary from pixel to pixel.)

In the pixel loop, as indicated at 1508, the main tap of the filter is set at an index indicated by the integer portion of phase_accumulator. At 1510 the current_phase variable is set equal to the non-integer portion of phase_accumulator. At 1512, the filter characteristic represented by the polynomial approximations may be effectively re-sampled at a smaller sample interval than the input sample interval to obtain a low-pass characteristic. For example if the sample interval is multiplied by the re-scaling factor (assuming it is less than one), the cut-off frequency of the resulting filter is ($\pi*$ the re-scaling factor), so that anti-aliasing filtering may be accomplished together with re-scaling filtering.

Figure 16:
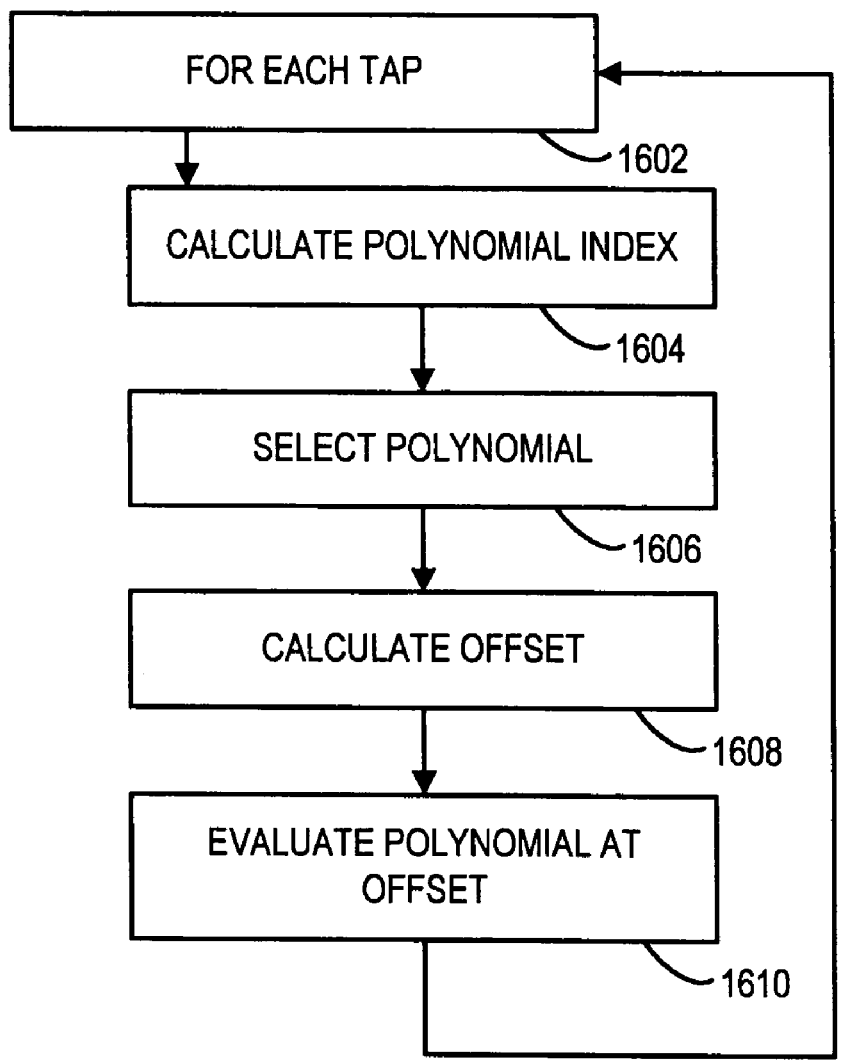
FIG. 16 is a flow chart that illustrates some details of the process of FIG. 15.

Details of the process stage at 1512 will now be described with reference to FIG. 16. The process stage at 1512 takes the form of a loop of functions performed, as indicated at 1602 in FIG. 16, with respect to each tap of the filter to be generated. In this loop, which may be referred to as a "tap loop", initially an index is calculated, as indicated at 1604, to indicate which polynomial is to be evaluated. At 1604 a parameter $s_n$ is calculated according to the following formula:

$$s_n = (H+1)/2 - \alpha/2 - ((H-1)/2 - n)\alpha + \phi\alpha; \quad (1)$$

where:

H is the number of taps of one phase of the polyphase filter bank (also the number of polynomials and curve intervals represented by the polynomials);

$\alpha$=the re-scaling factor, if the re-scaling factor is less than 1, and otherwise equals 1;

n is an index which indicates which tap is being calculated; and $\phi$ is the current_phase variable.

The polynomial index is then taken as the integer portion of $s_n$, and is used to select the polynomial to be evaluated, as indicated at 1606.

The offset is then taken, as indicated at 1608, as the non-integer portion of $s_n$, and the polynomial selected at 1606 is then evaluated at the offset, as indicated at 1610 to calculate the tap value. The tap loop then loops back to 1604 to calculate the next tap value. It will be appreciated that the offset may vary from one iteration of the tap loop to another, having been determined such that the filter generated at 1514 approximates a windowed sinc(t) function sampled at a smaller interval than the sample interval of the input sequence of samples.

Referring again to FIG. 15, at 1514 the input sample sequence is filtered by the re-sampled filter generated at 1512. At 1516, the value of phase_accumulator is increased by the value of phase_increment, and the pixel loop loops back to handle the next pixel. The pixel values output from the re-scaling filter 1402 represent the re-scaled row or column of the image, as the case may be.

With the re-sampling of the filter characteristic, the filter inherently has a low-pass characteristic of sufficiently narrow passband so that suitable anti-aliasing filtering occurs in the same operation with re-sizing filtering.

In another embodiment of the re-scaling filter 1402, the filter, prior to re-sampling, may be a polyphase filter bank represented by a coefficient table like that shown in FIG. 4, and having a characteristic like that shown in FIG. 3.

Figure 17:
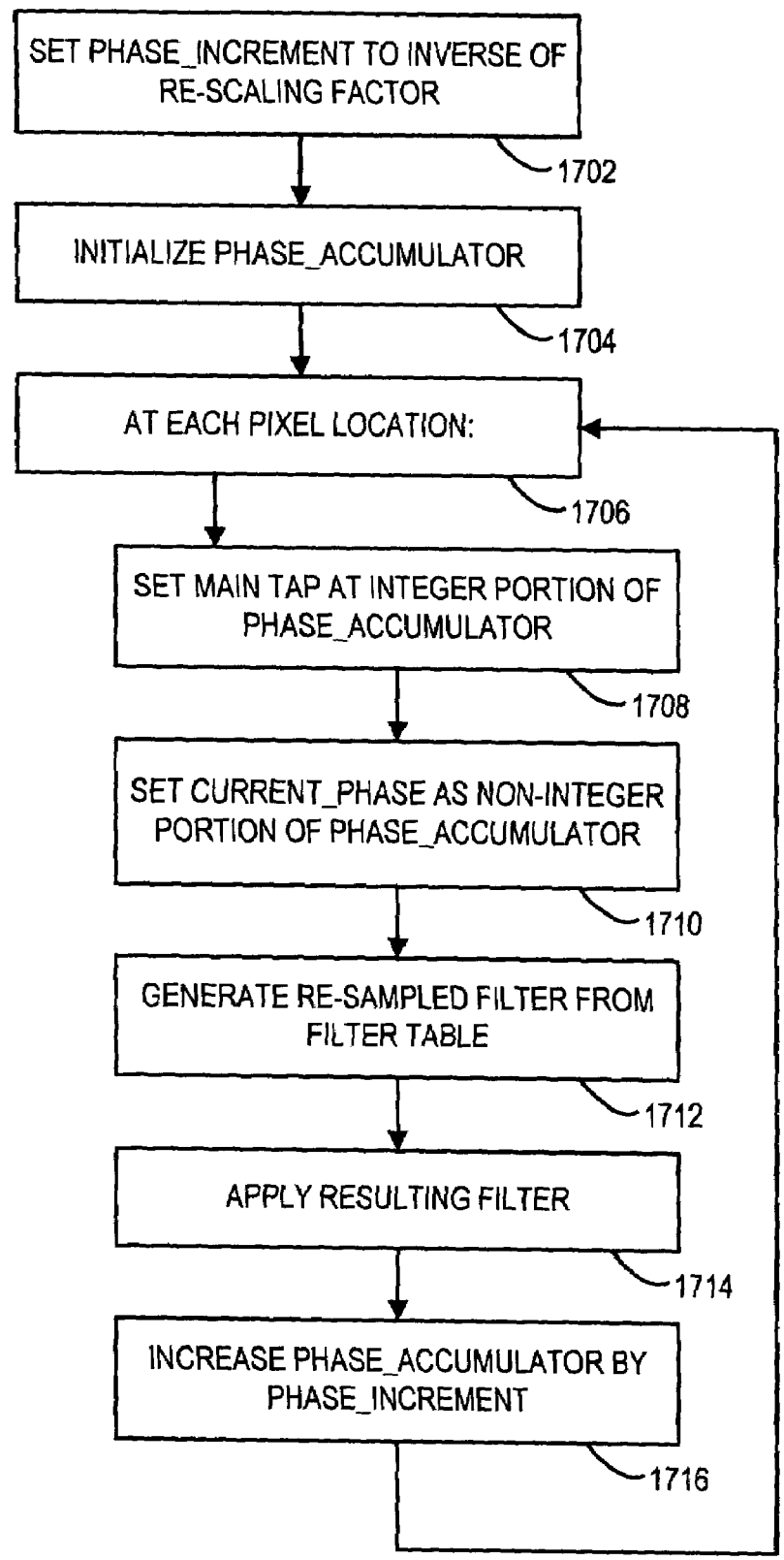
FIG. 17 is a flow chart that illustrates some details of an alternative one-dimensional re-scaling process that may be performed in other embodiments of the image re-scaling circuit of FIG. 14.

Some details of operation of this embodiment of the re-scaling filter 1402 will now be described with reference to FIG. 17. At 1702 in FIG. 17, the phase_increment variable is set to equal the inverse of the re-scaling factor currently selected by the re-scaling factor calculating block. At 1704, the phase_accumulator variable is initialized. In some embodiments the initial value of phase_accumulator may be set to 0.5. Then, as indicated at 1706, a loop of functions is performed at each pixel location along the row (or column) of pixels. (As in other embodiments described herein, the setting of phase_increment indicated at 1702 may be incorporated in the pixel loop to allow for anamorphic re-scaling with a re-scaling factor that may vary from pixel to pixel.)

In the pixel loop, as indicated at 1708, the main tap of the filter is set at an index indicated by the integer portion of phase_accumulator. At 1710, the current_phase variable is set equal to the non-integer portion of phase_accumulator. At 1712, the filter characteristic represented by the filter table may be effectively re-sampled at a smaller interval than the input sample interval to obtain a different frequency response.

Figure 18:
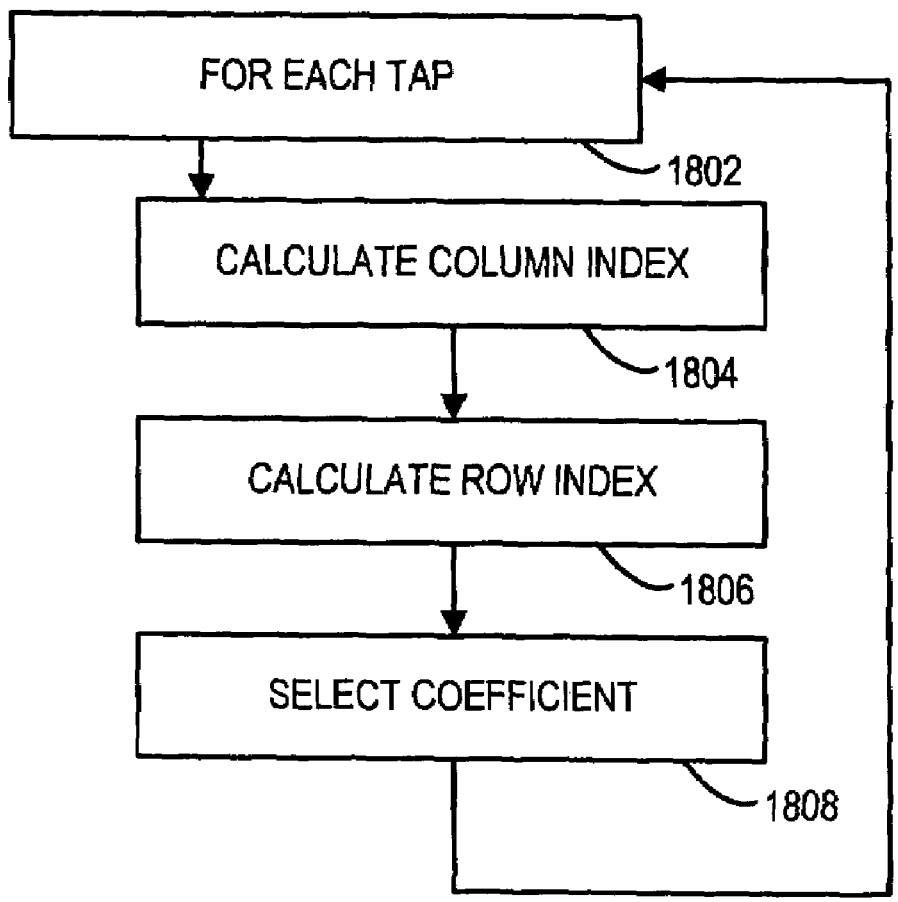
FIG. 18 is a flow chart that illustrates some details of the process of FIG. 17.

Details of the process stage at 1712 will now be described with reference to FIG. 18. The process stage of 1712 takes the form of a loop of functions performed, as indicated at 1802 in FIG. 18, with respect to each tap of the filter to be generated. In this loop, again referred to as the "tap loop", a column index is calculated, as indicated at 1804, to indicate the column of the table from which the tap coefficient is to be selected. At 1804, the same parameter $s_n$ is calculated as in Equation (1) above, and the column index is taken as the integer portion of $s_n$. Next, at 1806, the row index is calculated by multiplying the non-integer portion of $s_n$ by the number of phases of the polyphase filter bank (i.e., by the number of rows in the coefficient table), and then rounding the resulting product to the nearest integer. At 1808, the coefficient for the current tap is selected from the coefficient table based on the column index calculated at 1804 and the row index calculated at 1806. The tap loop then loops back to 1804 to select the next tap coefficient.

Referring again to FIG. 17, at 1714 the input sample sequence is filtered by the re-sampled filter generated at 1712. At 1716, the value of phase_accumulator is increased by the value of phase_increment, and the pixel loop loops back to handle the next pixel. The pixel values output by this embodiment of the re-scaling filter 1402 represent the re-scaled row or column of the image, as the case may be.

Again, with the re-sampling of the filter characteristic, the filter inherently has a low-pass characteristic of sufficiently narrow passband so that anti-aliasing filtering occurs in the same operation with re-sizing filtering.

Figure 19:
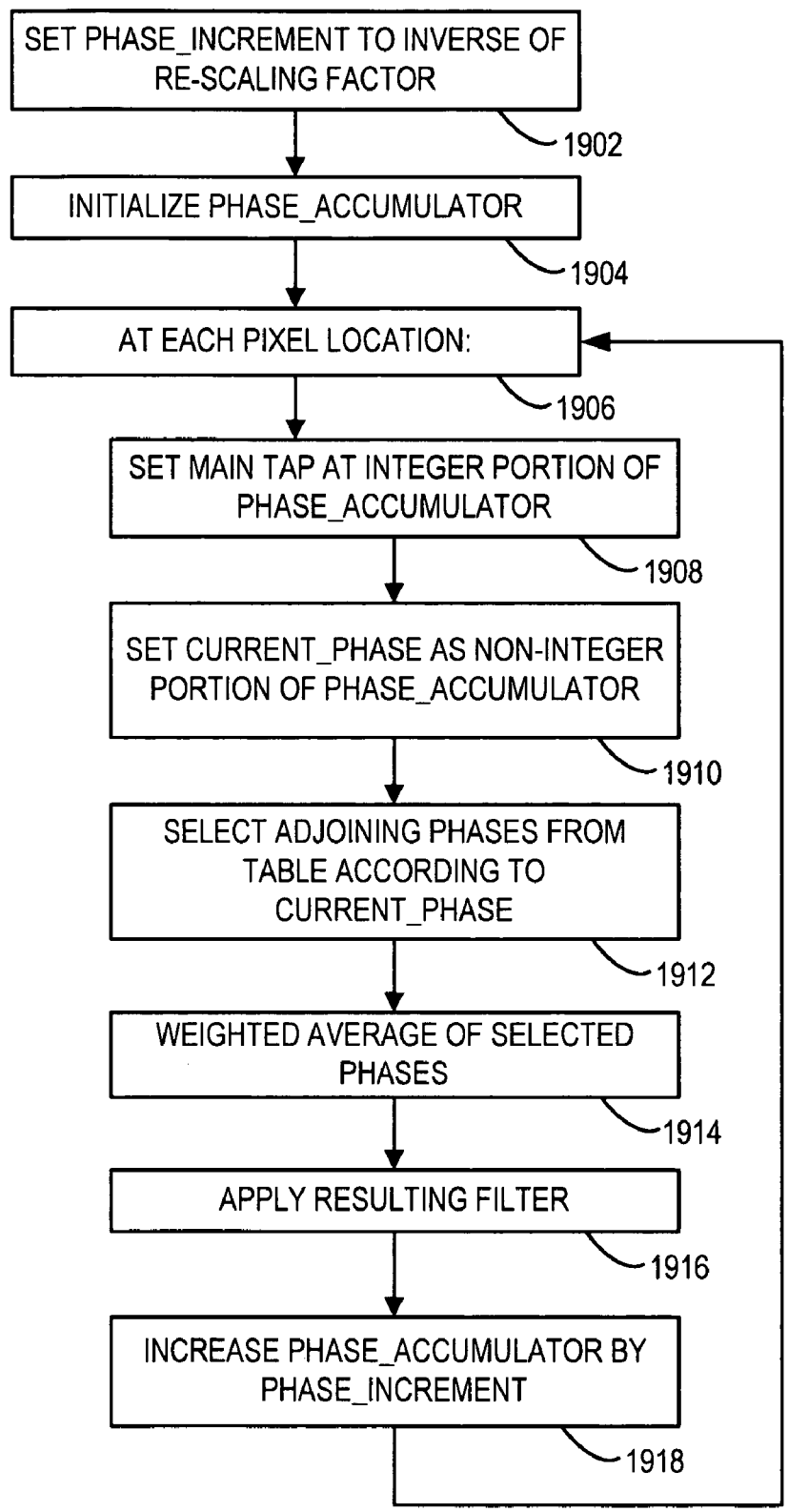
FIG. 19 is a flow chart that illustrates some details of an alternative one-dimensional re-scaling process that may be performed in one of the re-scaling circuits of FIGS. 2, 8, 10.

In embodiments described above with reference to FIGS. 7 and 18, a phase or a row index was selected by rounding from a phase offset or the like. However, in some embodiments greater precision may be desired, and accordingly interpolation between tap values may be employed rather than selection of the nearest tap value from the coefficient table. For example, FIG. 19 represents a modification of the process described above with reference to FIG. 7. At 1902 in FIG. 19, the phase_increment variable is set to the inverse of the currently selected re-scaling factor, M being (as discussed in connection with 610 in FIG. 6) the up-sampling factor in the embodiment of FIG. 2 and also being the number of phases of the polyphase filter bank and the number of rows in the filter table.

At 1904 in FIG. 19, the phase_accumulator variable is initialized. In some embodiments the initial value of phase_accumulator is set to 0.5. As indicated at 1906, a loop of functions is performed at each pixel location along the row (or column) of pixels. In the loop, as indicated at 1908, the main tap of the polyphase filter bank is set at an index indicated by the integer portion of the phase_accumulator. At 1910, the current_phase variable is set equal to the non-integer portion of phase_accumulator. At 1912, two adjoining phases of the polyphase filter bank are selected from the filter table, the two phases being those which bracket the product of M times the non-integer portion of phase_accumulator. Then (as indicated at 1914) at each column, the two selected row values are averaged in a weighted fashion according to where the product falls between the two row indexes. In effect, a weighted average of the two adjoining phases is calculated.

At 1916 the relevant portion of the input stream for the polyphase filter bank is filtered by the interpolated filter generated at 1914. At 1918, the value of phase_accumulator is increased by the value of phase_increment, and the pixel loop loops back to 1906, 1908 etc. to provide an output value for the next pixel.

(As in other embodiments described herein, the setting of phase_increment indicated at 1902 may be incorporated in the pixel loop to allow for anamorphic re-scaling with a re-scaling factor that may vary from pixel to pixel.)

The order in which functions are performed in any or all of the processes described herein is not meant to imply a fixed order of the functions, and the processes/functions may be performed in any order that is practicable.

In some embodiments the frame buffers 104, 110 may be combined. Whether combined or separate, the frame buffers may collectively be referred to as a "graphics memory unit".

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method for re-scaling image by variable re-scaling factor, the method comprising:
   receiving by a re-scaling circuit a sequence of samples that represents a row of pixels in an image;
   selecting a re-scaling factor for at least a portion of said row of pixels;
   selecting a filter from a bank of low pass filters in the re-scaling circuit based on the selected re-scaling factor;
   low-pass filtering the sequence of samples with the selected filter;
   upsampling the low-pass filtered sequence of samples by a factor M with a polyphase filter bank in the re-scaling circuit having a windowed sinc(t) characteristic, M being a positive integer; and
   down-sampling with a down-sampling block in the re-scaling circuit the polyphase-filtered sequence of samples by a factor N, N being an integer selected such that M/N is substantially equal to the selected re-scaling factor;
   wherein the re-scaling factor varies depending on a current position along said row of pixels;
   wherein said upsampling with the polyphase filter bank includes:
      implementing the polyphase filter bank with a table that comprises a plurality of rows and a plurality of columns;
      setting a first variable to equal an inverse of a currently selected scaling factor;
      initializing a second variable; and
   at each pixel location in said row of pixels;
      setting a main tap of the polyphase filter bank at an index indicated by an integer portion of the second variable;
      setting a third variable to equal a non-integer portion of the second variable;
      selecting a row from said table in accordance with a value of the third variable;
      filtering the sequence of samples by a phase of the polyphase filter bank which corresponds to the selected row from said table; and
      increasing a value of the second variable by a value of the first variable.

2. The method of claim 1, wherein N>M.

3. The method of claim 1, wherein M>N.

4. A method for re-scaling image by variable re-scaling factor, the method comprising:
   receiving by a re-scaling circuit a sequence of samples that represents a row of pixels in an image;
   selecting a re-scaling factor for at least a portion of said row of pixels;
   upsampling the sequence of samples by a factor M with a polyphase filter bank in the re-scaling circuit having a windowed sinc(t) characteristic, M being a positive integer;
   selecting a filter from a bank of low pass filters in the re-scaling circuit based on the selected re-scaling factor;
   low-pass filtering the polyphase-filtered sequence of samples with the selected filter from said bank of low pass filters; and
   down-sampling with a down-sampling block in the re-scaling circuit the low-pass-filtered sequence of samples by a factor N, N being an integer selected such that M/N is substantially equal to the selected re-scaling factor;
   wherein the re-scaling factor varies depending on a current position along said row of pixels;
   wherein said upsampling with the polyphase filter bank includes:
      implementing the polyphase filter bank with a table that comprises a plurality of rows and a plurality of columns;
      setting a first variable to equal an inverse of a currently selected scaling factor;
      initializing a second variable; and
   at each pixel location in said row of pixels;
      setting a main tap of the polyphase filter bank at an index indicated by an integer portion of the second variable;
      setting a third variable to equal a non-integer portion of the second variable; selecting a row from said table in accordance with a value of the third variable;
      filtering the sequence of samples by a phase of the polyphase filter bank which corresponds to the selected row from said table; and
      increasing a value of the second variable by a value of the first variable.

5. The method of claim 4, wherein N>M.

6. The method of claim 4, wherein M>N.

7. A method for re-scaling image by variable re-scaling factor, the method comprising:
   receiving by a re-scaling circuit a sequence of samples that represents a row of pixels in an image;
   selecting a re-scaling factor for at least a portion of said row of pixels;
   upsampling the sequence of samples by a factor M with a polyphase filter bank in the re-scaling circuit having a windowed sinc(t) characteristic, M being a positive integer;
   down-sampling with a first down-sampling block in the re-scaling circuit the polyphase-filtered sequence of samples by a factor $N_1$, $N_1$ being an integer;
   low-pass filtering the down-sampled sequence of samples with a bank of low pass filters in the re-scaling circuit; and
   down-sapling with a second down-sampling block in the re-scaling circuit the low-pass-filtered sequence of samples by a factor $N_2$, $N_2$ being an integer;
   wherein $N_2$ is selected such that $M/(N_1 * N_2)$ is substantially equal to the selected re-scaling factor; and
   wherein the re-scaling factor varies depending on a current position along said row of pixels;
   wherein said upsampling with the polyphase filter bank includes:
      implementing the polyphase filter bank with a table that comprises a plurality of rows and a plurality of columns;

setting a first variable to equal an inverse of a currently selected scaling factor;

initializing a second variable; and at each pixel location in said row of pixels;

setting a main tap of the polyphase filter bank at an index indicated by an integer portion of the second variable;

setting a third variable to equal a non-integer portion of the second variable;

selecting a row from said table in accordance with a value of the third variable;

filtering the sequence of samples by a phase of the polyphase filter bank which corresponds to the selected row from said table; and increasing a value of the second variable by a value of the first variable.

8. A method for re-scaling image by variable re-scaling factor, the method comprising:

storing a plurality of sets of coefficients in a table in a re-scaling circuit, each set of coefficients representing a polynomial approximation of a respective interval of a windowed sinc(t) function;

receiving by the re-scaling circuit a sequence of samples that represents a row of pixels in an image;

selecting a re-scaling factor for at least a portion of said row of pixels;

setting a first variable to equal an inverse of an integral multiple of the selected re-scaling factor;

initializing a second variable;

at each pixel location in said row of pixels:

setting a main tap of a filter at an index indicated by an integer portion of the second variable;

setting a third variable to equal a non-integer portion of the second variable;

evaluating each of said polynomial approximations at a point along a curve segment to generate filter coefficients to define said filter, said curve segment corresponding to said each polynomial approximation, said point along said curve segment corresponding to a value of said third variable;

applying said filter to selected samples from said sequence of samples to generate an output pixel value; and increasing a value of the second variable by a value of the first variable.

9. The method of claim 8, wherein said re-scaling factor varies depending on a current position along said row of pixels.

10. The method of claim 8, wherein each of said polynomial approximations is a third order polynomial.

11. A system for re-scaling image by variable re-scaling factor, the system comprising:

a bank of low pass filters in a re-scaling circuit to receive a sequence of samples that represents a row of pixels in an image;

a re-scaling factor block in the re-scaling circuit to select a re-scaling factor for at least a portion of said row of pixels and to select a filter from said bank of low pass filters based on the selected re-scaling factor, said selected filter to low pass filter the sequence of samples;

a polyphase filter bank in the re-scaling circuit coupled downstream from the bank of low pass filters to filter the low-pass filtered sequence of samples and to upsample the low-pass filtered sequence of samples by a factor M, M being a positive integer, the polyphase filter bank having a windowed sinc(t) characteristic; and a down-sample block in the re-scaling circuit coupled downstream from the polyphase filter bank and also coupled to the re-scaling factor block, to down-sample the sequence of samples filtered by the polyphase filter bank, the down-sampling by a factor N selected by the re-scaling factor block, N being an integer selected such that M/N is substantially equal to the selected re-scaling factor;

wherein the re-scaling factor block is operative to vary the re-scaling factor depending on a current position along said row of pixels;

wherein said bank of low pass filters includes at least three low pass filters, each having a respective cut-off frequency that is different from the cut-off frequency of the other low pass filters of the bank of low pass filters.

12. The system of claim 11, wherein the bank of low pass filters, the re-scaling factor block, the polyphase filter bank and the down-sample block are included in a video-processing integrated circuit (IC), the system further comprising a graphics memory unit in communication with the video-processing IC.

* * * * *